May 23, 1961 J. S. KIRKPATRICK 2,985,129
APPARATUS FOR PERFORMING OPERATIONS IN CONTROLLED ATMOSPHERE
Filed Jan. 28, 1957 2 Sheets-Sheet 2
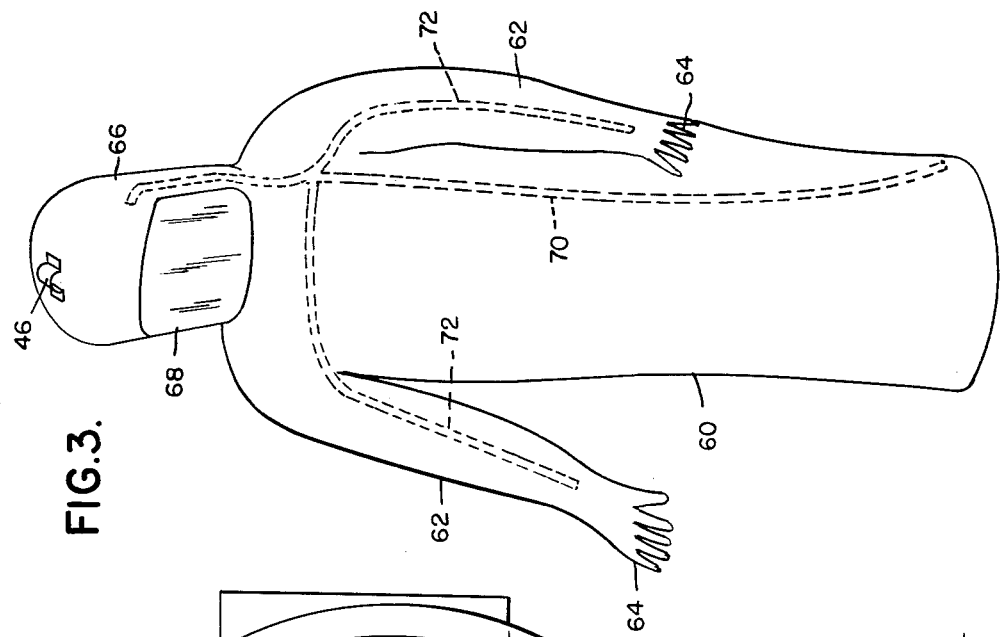
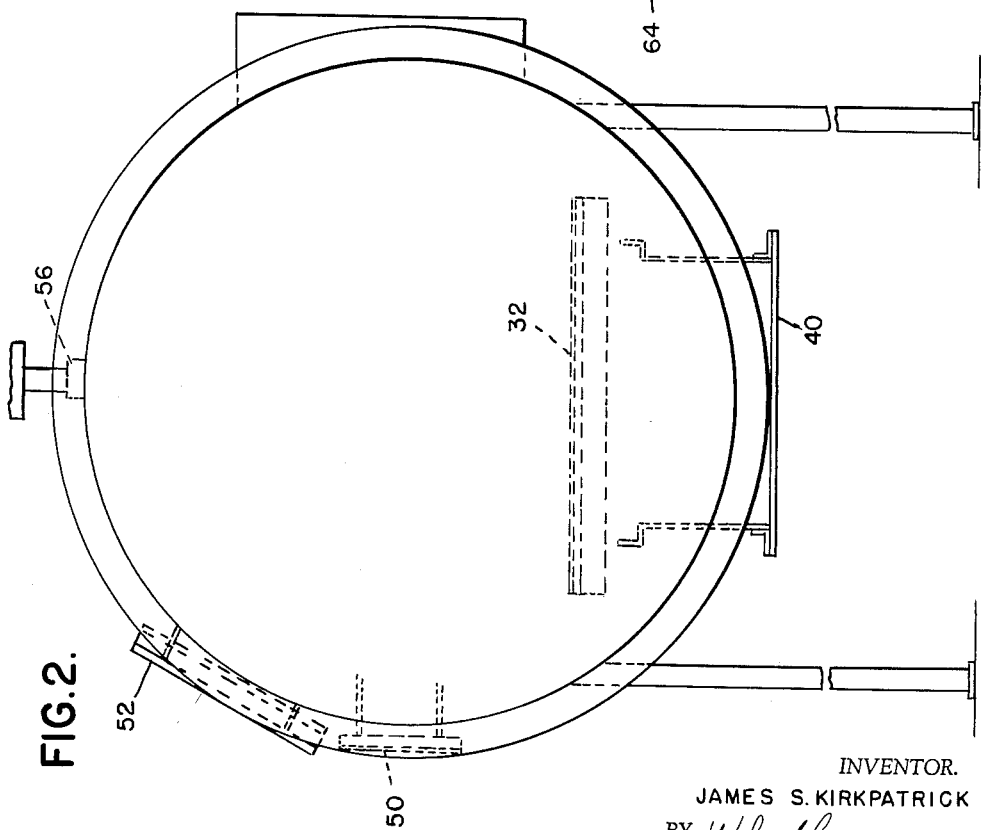
INVENTOR.
JAMES S. KIRKPATRICK
BY Whittemore,
Hulbert & Belknap
ATTORNEYS – # United States Patent Office 2,985,129
Patented May 23, 1961

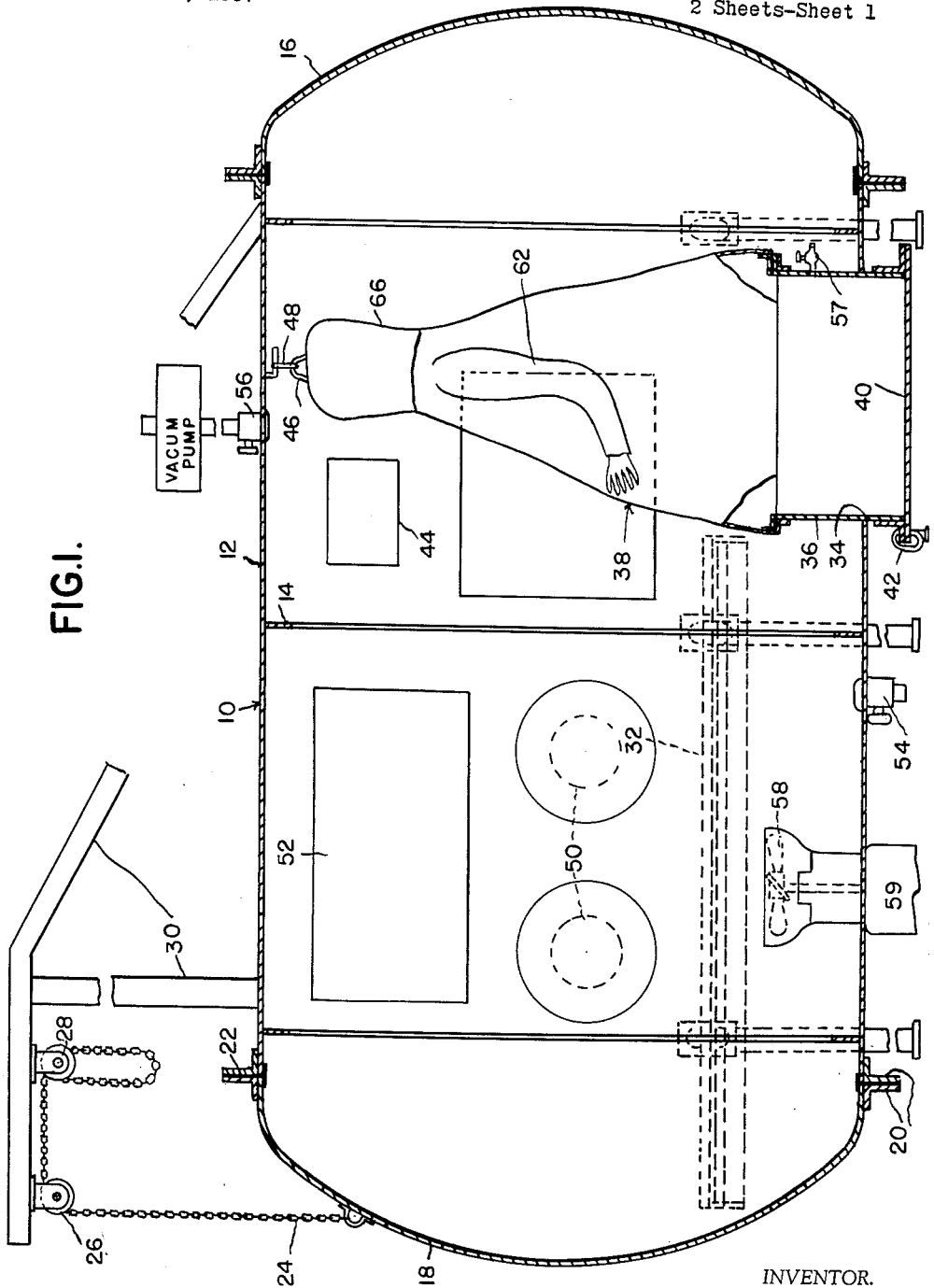

2,985,129

APPARATUS FOR PERFORMING OPERATIONS IN CONTROLLED ATMOSPHERE

James S. Kirkpatrick, Dearborn, Mich., assignor to Brooks & Perkins, Inc., Detroit, Mich., a corporation of Delaware Filed Jan. 28, 1957, Ser. No. 636,787

8 Claims. (Cl. 113—111)

The present invention relates to apparatus for performing operations in controlled atmosphere.

A typical example is in welding in inert atmosphere. At the present time certain metals such as titanium, zirconium and molybdenum present problems in welding inasmuch as the materials have a high affinity for oxygen and combine readily therewith at welding temperatures. In order to prevent the formation of oxides during welding, it is necessary to carry out the welding in an atmosphere devoid of oxygen.

In accordance with the present invention this is accomplished by providing a gas impervious tank the interior of which is filled with a suitable inert gas such for example as helium or argon, preferably at pressures slightly above atmospheric to avoid oxygen leakage into the interior of the tank.

In the past efforts along this line have followed two courses: In the first place, relatively small tanks have been provided with view plates in the side wall and arm ports below the view plate fitted with gas impervious sleeves and gloves. This restricted movement of the operator and access to the work to such a degree that it was impossible to perform many of the complex welding operations which are required. The second approach to the problem was of the provision of a substantially larger tank into which the operator entered completely. In this case it is of course essential for the operator to be completely covered in a sealed suit or garment and to have air supply or exhaust lines connected thereto and extending through a wall of the tank.

With this arrangement it is necessary for the operator to enter the tank, after which the tank can be sealed and efforts made to exhaust the tank. The presence of the operator with air entrapped at the surface of his suit, renders complete exhaustion of oxygen difficult if not impossible. Moreover, it requires the presence of the operator within the tank during the long period during which air is exhausted. Finally, the complete exhaustion of residual air and oxygen in the tank can be accomplished only by connecting the interior of the tank to a vacuum pump which means that for most efficient evacuation of the tank, the garment worn by the operator must be subjected to atmospheric pressure within the garment while the ambient space is brought to a pressure approaching zero.

In accordance with the present invention a tank of a size sufficient to permit the required operations is provided with a port of sufficient size to admit the upper torso of the operator. This port is closed with a garment adapted to cover the upper portion of the body of the operator. This garment includes a head covering with a view plate and sealed sleeve and glove portions for receiving the arms and hands of the operator. The garment is collapsible and a removable sealing plate is provided for the port so that during evacuation of the tank, the garment is initially collapsed and the sealing plate or cover provided over the port. Thereafter, the interior of the tank may be brought to minimum pressure as many times as required to remove the residual oxygen, the air being replaced by a suitable inert gas. Preferably, there is provided a valved connection between the interior of the suit and interior of the tank so that during evacuation, the interior and exterior of the suit may remain at the same pressure, and thus avoid undesirable stresses thereon.

With the foregoing general remarks in mind it is an object of the present invention to provide apparatus for facilitating operations in a controlled atmosphere.

More specifically, it is an object of the present invention to provide apparatus including a gas impervious tank having an enlarged port of a size sufficient to permit entry of the upper torso of an operator, the port being sealed by a flexible collapsible garment.

It is a further object of the present invention to provide in apparatus as described in the preceding paragraph, a garment including a head covering provided with a view plate and sealed sleeve and glove portions for receiving the arms and hands of an operator.

It is a further object of the present invention to provide apparatus of the character described including an enlarged access port of a size to receive the upper torso of an operator, a partial garment having a skirt portion sealed to the edges of the port, said garment being collapsible, a removable closure for the port, and means for exhausting gas from the interior of the tank.

It is a further object of the present invention to provide apparatus of the character described including a table within the tank convenient for access by the operator, and a view plate in the wall of the tank, and armholes adjacent the view plate equipped with sealed sleeve and glove portions for use by an assistant to the operator.

It is a further object of the present invention to provide apparatus of the character described comprising a sealed tank, means for connecting the interior of the tank to a vacuum pump, means for supplying an inert gas to the interior of the tank, a fan within the tank, a motor exterior of the tank and operatively connected to the fan to keep gas within the tank in motion and to facilitate exhausting oxygen from the tank.

Other objects and features of the invention will become apparent as the description proceeds, especially when taken in conjunction with the accompanying drawing, illustrating a preferred embodiment of the invention, wherein:

Figure 1 is a vertical section through the apparatus.

Figure 2 is an end view of the apparatus.

Figure 3 is an elevational view of a partial garment employed in the combination.

Referring now to the drawings, the tank 10 is shown as formed of a generally cylindrical central portion 12 suitably reinforced by annular flanges 14 and having removable dome shaped end sections 16 and 18 connected thereto by suitable sealing means including radially extending flanges 20 having sealing gaskets 22 therebetween. The flanges 20 may be bolted together at one end and at the other end attached by removable clamping means or dogs (not shown).

Inasmuch as the domed end 18 of the tank is relatively heavy, preferably it is connected by a chain 24 leading over a pulley 26 to motor means 28 such for example as a chain hoist for raising and suspending the domed end portion 18. Conveniently, the pulley 26 and chain hoist 28 are suspended from a channel frame indicated generally at 30 mounted directly on the top wall of the tank.

Within the tank there is provided a work table 32 and adjacent one side of the work table 32 and at the bottom of the tank there is provided an opening 34 which receives a tubular member 36 forming an access port for the operator. At the upper end of the access port there is attached the lower edge or skirt of a partial garment indicated generally at 38 and which will subsequently be described. At its lower end the tubular member 36 is provided with a removable sealing plate 40 which may be attached thereto by removable clamp means such as those indicated diagrammatically at 42.

The port provided by the tubular member 36 is of a size sufficient to permit entry of the upper torso of the operator. On the interior side wall of the tank there is provided an electrical panel 44 convenient to access by the operator. The garment has at its upper portion a loop 46 and the top wall of the tank is provided with a hook 48 engageable with the loop so that the operator may engage the loop over the hook and move directly out of the garment while it remains in supported position within the tank. Thus, the operator may move quickly out of the garment and return thereto while the garment remains suspended from the hook 48.

Conveniently, in the side of the tank adjacent the table 32 there are provided a pair of armholes 50 each of which is provided with a sealed sleeve and glove portion to permit an assistant to reach into the tank. Located above the armholes 50 is a rectangular view plate 52 through which the assistant may see the table.

In order to effect substantially complete evacuation of atmospheric air, it is necessary to repeatedly exhaust the interior of the tank, preferably to as high a vacuum as possible. For this purpose the tank is provided with a gas inlet indicated diagrammatically at 54, and a gas outlet 56 adapted to be connected to a suitable vacuum pump.

It will be appreciated that air at atmospheric pressure within the garment 38 would subject the garment to unacceptable forces if the interior of the tank were completely evacuated. To avoid this difficulty, the garment is made collapsible and prior to evacuation of the tank, the garment is substantially completely collapsed downwardly from the position shown in Figure 1, after which the sealing plate or cover 40 is applied to the lower end of the tubular member 36. Thereafter, as the interior of the tank is evacuated, the residual air trapped within the interior of the garment and between the garment and the plate 40 expands at a reduced pressure and in no case will the interior of the garment be subjected to anything but a small fraction of atmospheric pressure. Similar exterior closure means will of course be provided for the armholes for the assistant.

As a modification of the foregoing, the side wall of the tubular member 36 may be provided with a petcock 57 which may be opened after the plate 40 has been applied to the tubular member 36. The petcock affords communication between the interior of the garment 38 and the interior of the tank 10 so that as the tank is evacuated, so also is the interior of the garment. Of course before the operator is required to enter the garment, the evacuation cycle of the tank will have been completed and the interior of the tank will have been brought to or slightly above atmospheric pressure before removal of the plate 40.

In order to insure movement of air and/or gas within the interior of the tank so as to prevent a residual quantity of oxygen remaining therein, it is desirable to provide means for keeping the gas in motion. This means comprises a fan 558 located within the tank and operatively connected to a motor 559 exterior of the tank.

Referring now to Figure 3, the garment is shown as formed essentially of a body portion 60 having integral or at least perfectly sealed sleeve portions 62 and glove portions 64 attached thereto. Conveniently, the garment may be formed of a vinyl resin such for example as polyvinyl chloride resin having a thickness of about .020 inch. The garment includes a head covering 66 provided with a transparent plastic view plate 68. Means are provided for supplying air to the occupant of the suit and this means is illustrated as comprising an air passage 70 extending to the interior of the head covering 66 for supplying air for the operator to breathe. Preferably, the air passage 70 includes air branches 72 leading to at least the outer ends of the sleeve portions. These provide for a circulation of air in the gloves and sleeves for cooling purposes and also to some extent tend to keep these portions slightly inflated to facilitate withdrawal by the operator of his hands and arms. It will of course be appreciated that the air passages 70 and 72 may be constituted by flexible rubber tubes or the like, suitably connected to exterior supply means.

One of the extremely useful features of the present invention is that the operator inserts only the upper portion of his body within the tank and he does this through an enlarged port located in the bottom wall of the tank. Thus, if an accident occurs to the operator which might render him unconscious, he would simply drop out of the tank and out of the sealing garment.

The drawings and the foregoing specification constitute a description of the improved apparatus for performing operations in controlled atmosphere in such full, clear, concise and exact terms as to enable any person skilled in the art to practice the invention, the scope of which is indicated by the appended claims.

What I claim as my invention is:

1. Apparatus for performing operations in controlled atmosphere comprising a gas impervious tank, gas inlet and outlet means therefor, an enlarged port in said tank of a size to admit the upper torso of an operator, a gas impervious partial garment having a skirt sealed to the edge of said port, the interior of said garment being at all times in use open at said port to atmosphere, said garment conforming generally to the upper torso of an operator and including a head covering with a view plate and sealed sleeves and gloves connected thereto, and an air supply passage extending to the interior of said head covering.

2. Apparatus for performing operations in controlled atmosphere comprising a gas impervious tank, gas inlet and outlet means therefor, an enlarged port in said tank of a size to admit the upper torso of an operator, a gas impervious partial garment having a skirt sealed to the edge of said port, the interior of said garment being at all times in use open at said port to atmosphere, said garment conforming generally to the upper torso of an operator and including a head covering with a view plate and sealed sleeves and gloves connected thereto, and air supply passage means extending to the interior of the head covering and to the end portions of said sleeves.

3. Apparatus for performing operations in controlled atmosphere comprising a gas impervious tank, gas inlet and outlet means therefor, an enlarged port in said tank of a size to admit the upper torso of an operator, a gas impervious partial garment having a skirt sealed to the edge of said port, the interior of said garment being at all times in use open at said port to atmosphere, said garment conforming generally to the upper torso of an operator and including a head covering with a view plate and sealed sleeves and glooves connected thereto, said port being located in the underside of said tank to allow the operator to drop downwardly out of the port and garment.

4. Apparatus for performing operations in controlled atmosphere comprising a gas impervious tank, gas inlet and outlet means therefor, an enlarged port in said tank of a size to admit the upper torso of an operator, a gas impervious partial garment having a skirt sealed to the edge of said port, the interior of said garment being at all times in use open at said port to atmosphere, said garment conforming generally to the upper torso of an operator and including a head covering with a view plate and sealed sleeves and gloves connected thereto, a vacuum pump connected to said gas outlet means and a removable sealing closure for said port to prevent unlimited atmospheric pressure being applied to the interior of said garment when the tank is evacuated.

5. Apparatus for performing operations in controlled atmosphere comprising a gas impervious tank, gas inlet and outlet means therefor, an enlarged port in said tank of a size to admit the upper torso of an operator, a gas impervious partial garment having a skirt sealed to the edge of said port, the interior of said garment being at all times in use open at said port to atmosphere, said garment conforming generally to the upper torso of an operator and including a head covering with a view plate and sealed sleeves and gloves connected thereto, a vacuum pump connected to said gas outlet means and a removable sealing closure for said port to prevent unlimited atmospheric pressure being applied to the interior of said garment when the tank is evacuated, said garment being collapsible to limit the air at atmospheric pressure trapped therein when said port is closed prior to evacuating said tank.

6. Apparatus for performing operations in controlled atmosphere comprising a gas impervious tank, gas inlet and outlet means therefor, an enlarged port in said tank of a size to admit the upper torso of an operator, a gas impervious partial garment having a skirt sealed to the edge of said port, the interior of said garment being at all times in use open at said port to atmosphere, said garment conforming generally to the upper torso of an operator and including a head covering with a view plate and sealed sleeves and gloves connected thereto, a vacuum pump connected to said gas outlet means, a fan within said tank, and motor means exterior to said tank operatively connected to said fan.

7. Apparatus for performing operations in controlled atmosphere comprising a gas impervious tank, gas inlet and outlet means therefor, an enlarged port in said tank of a size to admit the upper torso of an operator, a gas impervious partial garment having a skirt sealed to the edge of said port, the interior of said garment being at all times in use open at said port to atmosphere, said garment conforming generally to the upper torso of an operator and including a head covering with a view plate and sealed sleeves and gloves connected thereto, a removable valve for closing said port with said garment inside of the tank, a vacuum pump connected to said gas outlet means, and additional valve means for connecting the interior of the garment to the interior of the tank to equalize pressures during evacuation of the tank.

8. Apparatus for performing operations in controlled atmosphere comprising a gas impervious tank, gas inlet and outlet means therefor, an enlarged port in said tank of a size to admit the upper torso of an operator, a gas impervious partial garment having a skirt sealed to the edge of said port, the interior of said garment being at all times in use open at said port to atmosphere, said garment conforming generally to the upper torso of an operator and including a head covering with a view plate and sealed sleeves and gloves connected thereto, said port being located in the underside of said tank to allow the operator to drop downwardly out of the port and garment, and selectively engageable garment support means including a part carried at the interior of said tank above said port and a cooperating part carried by the top of said garment, said support being operable to retain the garment in erect position in the tank as the operator withdraws himself from it.

References Cited in the file of this patent

UNITED STATES PATENTS

| | | |
|---|---|---|
| 1,152,610 | De Bats | Sept. 7, 1915 |
| 1,550,651 | Charter | Aug. 18, 1925 |
| 1,613,061 | Smith | Jan. 4, 1927 |
| 1,749,765 | Hendrickson | Mar. 11, 1930 |
| 2,404,157 | Ahalt | July 16, 1946 |
| 2,414,312 | Lee | Jan. 14, 1947 |
| 2,459,812 | Griffiths | Jan. 25, 1949 |
| 2,473,033 | Letac | June 14, 1949 |
| 2,576,008 | Gladfelter et al. | Nov. 20, 1951 |
| 2,693,088 | Green | Nov. 2, 1954 |
| 2,747,066 | Brace | May 22, 1956 |
| 2,813,022 | Moulthrop | Nov. 12, 1957 |

FOREIGN PATENTS

| | | |
|---|---|---|
| 442,425 | Italy | Nov. 23, 1948 |